United States Patent
Frank et al.

(10) Patent No.: US 9,080,486 B2
(45) Date of Patent: Jul. 14, 2015

(54) METHOD AND DEVICE FOR REGENERATING A PARTICLE FILTER

(75) Inventors: Michael Frank, Vaihingen/Enz (DE); Klaus Winkler, Rutesheim (DE); Andreas Kufferath, Besigheim (DE); Dimitrios Stavrianos, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 1005 days.

(21) Appl. No.: 13/183,936

(22) Filed: Jul. 15, 2011

(65) Prior Publication Data
US 2012/0031074 A1    Feb. 9, 2012

(30) Foreign Application Priority Data
Aug. 6, 2010   (DE) .......................... 10 2010 039 013

(51) Int. Cl.
| | |
|---|---|
| *F01N 3/00* | (2006.01) |
| *F01N 3/10* | (2006.01) |
| *F02D 41/02* | (2006.01) |
| *F02D 41/14* | (2006.01) |
| *F01N 13/00* | (2010.01) |
| *F01N 3/035* | (2006.01) |

(52) U.S. Cl.
CPC .............. *F01N 3/101* (2013.01); *F01N 13/009* (2014.06); *F02D 41/029* (2013.01); *F02D 41/0235* (2013.01); *F02D 41/1441* (2013.01); *F02D 41/1454* (2013.01); *F01N 3/035* (2013.01); *Y02T 10/22* (2013.01)

(58) Field of Classification Search
CPC ..... F01N 3/2066; F01N 3/0842; F01N 3/035; F01N 2610/02; F01N 2610/03; F01N 13/02; F01N 9/002; F02D 41/029

USPC .................. 60/274, 285, 286, 295, 297, 311
See application file for complete search history.

(56) References Cited

U.S. PATENT DOCUMENTS

| | | | |
|---|---|---|---|
| 7,137,248 B2 * | 11/2006 | Schaller ......................... | 60/297 |
| 7,207,171 B2 * | 4/2007 | Nagaoka et al. ................. | 60/295 |

(Continued)

FOREIGN PATENT DOCUMENTS

| | | | | |
|---|---|---|---|---|
| DE | 10014881 A1 * | 9/2001 | ............. | F02D 41/14 |
| DE | 102008036127   * | 2/2010 | ............. | F02D 41/02 |

OTHER PUBLICATIONS

Machine Translation of DE 102008036127 A1, Machine Translated on Jun. 11, 2014.*

*Primary Examiner* — Thomas Denion
*Assistant Examiner* — Patrick Maines
(74) *Attorney, Agent, or Firm* — Michael Best & Friedrich LLP

(57) ABSTRACT

A method and device for monitoring and controlling the regeneration of a particle filter in an exhaust gas duct of an internal combustion engine which has a three-way catalytic converter downstream of the particle filter, wherein the particle filter is regenerated by oxidative burning of the particles during a regeneration phase, wherein oxygen consumption is balanced, directly or indirectly, during the regeneration phase via the temporal variation of a first signal of a first lambda probe, which is arranged upstream of the particle filter, in comparison to the temporal variation of a second signal of a second lambda probe, which is arranged downstream of the particle filter. A lambda value of $\lambda=1$ is set downstream of the three-way catalytic converter during the regeneration of the particle filter by means of lambda control and the second lambda probe which is arranged downstream of the three-way catalytic converter.

8 Claims, 1 Drawing Sheet

(56) References Cited

U.S. PATENT DOCUMENTS

| | | | |
|---|---|---|---|
| 2004/0016227 A1* | 1/2004 | Kitahara | 60/285 |
| 2007/0033926 A1* | 2/2007 | Takubo | 60/285 |
| 2010/0011749 A1* | 1/2010 | Fujiwara et al. | 60/286 |
| 2010/0132680 A1* | 6/2010 | Iwahashi | 123/697 |
| 2011/0036144 A1* | 2/2011 | Weiss et al. | 73/23.2 |
| 2011/0167802 A1* | 7/2011 | Bruck | 60/274 |
| 2011/0219746 A1* | 9/2011 | Yezerets et al. | 60/274 |
| 2012/0031076 A1* | 2/2012 | Frank et al. | 60/274 |
| 2012/0216507 A1* | 8/2012 | Nieuwstadt | 60/274 |

* cited by examiner

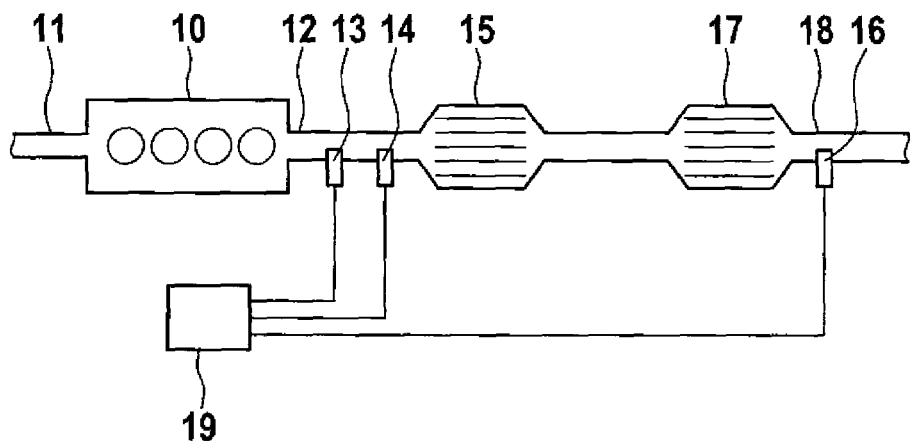

METHOD AND DEVICE FOR REGENERATING A PARTICLE FILTER

BACKGROUND OF THE INVENTION

The invention relates to a method for monitoring and controlling the regeneration of a particle filter in an exhaust gas duct of an internal combustion engine which has a three-way catalytic converter downstream of the particle filter in the direction of flow of the exhaust gas, wherein the particle filter is regenerated by oxidative burning of the particles during a regeneration phase, wherein oxygen consumption is balanced, directly or indirectly, during the regeneration phase via the temporal variation of a first signal of a first lambda probe, which is arranged upstream of the particle filter in the exhaust gas direction, in comparison to the temporal variation of a second signal of a second lambda probe, which is arranged downstream of the particle filter in the exhaust gas direction.

The invention furthermore relates to a device for carrying out the method according to the invention.

In order to reduce the particle emission from diesel engines and in future to an increasing extent from spark ignition engines (limit values according to EU6 from 2014), particle filters are inserted in the exhaust gas duct of the internal combustion engines. The exhaust gas is conducted through the particle filter which separates off the solid particles in the exhaust gas and retains said particles in a filter substrate. By means of the soot masses embedded in the filter substrate, the particle filter becomes clogged over time, this becoming apparent in an increase in the exhaust gas counterpressure with a negative effect on the engine performance and the fuel consumption. For this reason, the embedded soot mass has to be discharged from time to time. This filter regeneration takes place during special regeneration phases by oxidative burning of the particles, which runs automatically in the form of an exothermic reaction if there is an exhaust gas temperature of at least 580° C. and a sufficiently high concentration of oxygen in the exhaust gas. The course of the regeneration can be controlled via the composition of the exhaust gas and the exhaust gas temperature.

In addition to the particle filter, the exhaust gas aftertreatment of internal combustion engines requires further components. Thus, in the case of spark ignition engines which are operated according to a homogeneous concept, the pollutants hydrocarbon (HC), carbon monoxide (CO) and nitrogen oxides ($NO_x$) are converted via a three-way catalytic converter. In the case of lean concepts, a storage catalytic converter for nitrogen oxides is generally connected downstream. As little pollutant emission as possible is achieved by lambda control, with the fuel-air mixture supplied to the internal combustion engine being set on the basis of the concentration of oxygen in the exhaust gas. The oxygen fraction present in the exhaust gas is described by a lambda value which obtains the value 1 for stoichiometric combustion, the value>1 in the event of an excess of oxygen and a value<1 for a lack of oxygen. The lambda value is measured by corresponding lambda probes arranged in the exhaust gas duct.

The particle filter is generally regenerated if, as already explained above, a limit value for an exhaust gas counterpressure is exceeded. This can be detected by a suitable model and adjusted via a differential pressure measurement. In this case, the oxidation of the soot and therefore the regeneration of the filter are decisively influenced by the exhaust gas temperature and the residual oxygen content. Since an excess of oxygen has to be present in the exhaust gas in order to burn the particles, the mixture composition of the internal combustion engine cannot be freely selected in this phase as per the requirements of the driving mode. It is therefore desirable to determine an end of the regeneration in order to be able to switch to the normal driving mode.

The applicant's patent application which has not yet been published and has the official application number DE 10 2009 028237.8 discloses a method for monitoring and controlling the regeneration of a particle filter in an exhaust gas duct of an internal combustion engine, wherein the particle filter is regenerated by oxidative burning of the particles during a regeneration phase. In this case, it is provided that, during the regeneration phase of the particle filter, the internal combustion engine is operated at least temporarily at a lean operation point during lean operating phases or during oscillation of the mixture, and that the regeneration of the particle filter is monitored during the lean operating phases or during the oscillation of the mixture via the temporal variation of a second signal of a second lambda probe, which is arranged downstream of the particle filter in the exhaust gas direction, or of a second characteristic variable derived therefrom, in comparison to the temporal variation of a first signal of a first lambda probe, which is arranged upstream of the particle filter in the exhaust gas direction, or of a first characteristic variable derived therefrom. It is disadvantageous in this case that the regeneration takes place within a lean phase in which other harmful exhaust gas components cannot be optimally removed.

It is therefore the object of the invention to provide a method which permits reliable control and monitoring of the regeneration of the particle filter, wherein other harmful exhaust gas components can also be removed to an adequate extent from the exhaust gas.

It is furthermore the object of the invention to provide a corresponding device for carrying out the method.

SUMMARY OF THE INVENTION

The object of the invention relating to the method is achieved in that a lambda value of $\lambda=1$ is set downstream of the three-way catalytic converter during the regeneration of the particle filter by means of lambda control and the second lambda probe which is arranged downstream of the three-way catalytic converter.

The object relating to the device is achieved in that the device has a control device via which the regeneration of the particle filter is controlled and monitored and can be evaluated with signals of a first lambda probe, which is arranged upstream of the particle filter in the exhaust gas direction, in comparison to signals of a second lambda probe, which is arranged downstream of the particle filter in the exhaust gas direction, and consumption of oxygen can be balanced directly or indirectly therefrom, wherein lambda control is realized during the regeneration of the particle filter by a program routine implemented in the control unit, and a lambda value of $\lambda=1$ can be set downstream of the three-way catalytic converter by means of the second lambda probe which is arranged downstream of the three-way catalytic converter.

With the method and the device, adequate conversion for all of the harmful exhaust gas components can be achieved during the regeneration of the particle filter, since an ideal lambda value is preset for the conversion. In this case, use is made of the fact that, when the exhaust gas temperature lies within a range permitting regeneration, the regeneration takes place automatically with conversion of the other pollutant components being maintained, since there is always still a certain residual oxygen fraction (0.5 to 0.7%) in the untreated exhaust gas. The requirement for regeneration of the particle filter can be identified from a suitable model or by means of a corresponding sensor arrangement, for example differential pressure measurement, wherein, for the initiation of the regeneration, first of all the further environmental conditions, for example the exhaust gas temperature and the current type of operation, are checked.

However, it has to be ensured by means of continuous monitoring that exothermy due to the burning of the soot does not become too large since otherwise there is the risk of damage to the particle filter. Therefore, in a preferred variant method, during the regeneration phase of the particle filter, exothermy as a consequence of burning soot is determined from the oxygen balancing upstream and downstream of the particle filter and, if a specified limit value for the exothermy is exceeded, the regeneration process is slowed down or ended. For this purpose, the sensor arrangement of the lambda probes around the particle filter and a primary catalytic converter can be used, with it being possible for provision to be made for the particle filter to be integrated in a primary catalytic converter which is mounted upstream of the three-way catalytic converter in the direction of flow of the exhaust gas.

The oxygen consumed for the oxidation of the hydrocarbons (HC) and the carbon monoxide (CO) in the exhaust gas and of the soot can be balanced from the difference between the lambda probe downstream of the three-way catalytic converter and the lambda probe upstream of the particle filter. The enthalpy released can be calculated from the balance of oxygen consumed, with the correlation between consumed oxygen and released energy being linear in a first approximation. Said enthalpy is associated with a temperature rise in the particle filter and in the three-way catalytic converter. Since it is known how much oxygen is consumed for the oxidation of CO and HC in the catalytic converter, the residual oxygen which is still available for the particle filter follows from the difference between said value and the oxygen content from the overall balance. The exothermy in the particle filter can be calculated using the oxygen calculated for the particle filter.

In order to avoid putting components at risk, it is provided that, if the limit value for the exothermy is exceeded, the regeneration is actively slowed down or ended with a lambda setting of $\lambda<1$. It should be noted that the presetting of a rich lambda value, i.e. $\lambda<1$, is not neutral in terms of exhaust gas, since in this case the conversion of the harmful exhaust gas components is not entirely ensured but this should be classified as protecting the components, which is accepted by the legislator.

It can be provided here that, by means of the presetting to a lambda value of $\lambda<1$, a lack of oxygen arises and the soot is oxidized via an endothermic heterogeneous water and gas equilibrium reaction ($C+H_2O \leftrightarrow CO+H_2$), and therefore the temperature loading in the particle filter can additionally be reduced. In this case, use can be made of the fact that, if there is a lack of oxygen, there is a change in the reaction kinetics for regenerating the particle filter. No additional oxygen is required here in the exhaust gas. Water is always present in the exhaust gas from combustion.

The end of the regeneration phase, i.e. the complete oxidation of the soot embedded in the particle filter, can be detected from a comparison of the signals of the first lambda probe and from those of the second lambda probe. Therefore, additional sensors are not required.

The particle filter is furthermore put at risk by locally high temperature gradients which may occur, for example due to excessively rapid regeneration under a high soot load and simultaneously high temperatures. Critical states of this type are achieved especially if the regeneration is already active and there is a sudden significant increase in the concentration of oxygen. For this reason, it is advantageous if an overrun cutoff is prevented during the active regeneration phase.

Since even the lean operation may cause an increased admission of oxygen to the particle filter, it is provided in a further variant of the method that, during or after the regeneration phase, lean operation with a lambda value of $\lambda>1$ is avoided for as long as critical conditions are present. Critical conditions include the exhaust gas temperature if the latter is lower than a limit value for the oxidation of soot, and the charging of the particle filter with soot if the quantity of soot is lower than a limit value.

A preferred use of the method, as described beforehand in terms of variant embodiments thereof, envisages the use for regenerating a particle filter close to the engine in the exhaust gas duct of an internal combustion engine which is embodied as a spark ignition engine and has suction-tube injection or direct injection. It is advantageous in this case that recourse can be made to existing lambda probes and to existing sensor concepts, since lambda probes are already provided in the exhaust gas duct of spark ignition engines for the lambda control, and therefore the signals of said lambda probes can be used at the same time for controlling the regeneration of the particle filter, as a result of which the method can be used particularly cost-effectively in future spark ignition engines having a particle filter.

BRIEF DESCRIPTION OF THE DRAWINGS

The invention is explained in more detail below with reference to an exemplary embodiment which is illustrated in the FIGURE, in which:

FIG. 1 shows an internal combustion engine with a particle filter arranged in the exhaust gas duct thereof and with a three-way catalytic converter arranged downstream.

DETAILED DESCRIPTION

FIG. 1 shows an internal combustion engine 10 with an air supply 11 and a particle filter 15 arranged in an exhaust gas duct 12 and with a three-way catalytic converter 17 arranged downstream. The exhaust gas from the internal combustion engine 10, which exhaust gas is cleaned in the particle filter 15 and the three-way catalytic converter 17, is conducted away via an exhaust gas outlet 18. The lambda value of the exhaust gas in the exhaust gas duct 12 directly downstream of the internal combustion engine 10 is determined by means of a first lambda probe 13. In this region, the temperature of the exhaust gas is additionally determined by means of a temperature sensor 14. During operation of the internal combustion engine 10, particles are accumulated in the particle filter 15. This increase the exhaust gas counterpressure. The particle filter 15 therefore has to be burnt free when necessary and thus regenerated. Regeneration can take place only if the exhaust gas temperature is above approximately 580° C.; this can be established with the temperature sensor 14. Furthermore, there has to be a sufficient amount of oxygen for combustion. This can be established with the first lambda probe 13. A second lambda probe 16 is arranged in the exhaust gas duct 12 downstream of the particle filter 15 and the three-way catalytic converter 17 arranged downstream. In one variant embodiment, provision can be made for the particle filter 15 to be integrated in a preliminary catalytic converter which is mounted upstream of the three-way catalytic converter 17 in the direction of flow of the exhaust gas.

It can be determined from the difference in the output signals of the first lambda probe 13 and the second lambda probe 16 how much oxygen is consumed by the burning of particles in the particle filter 15. If no difference can be established between the signals, the burning is ended. The signals of the first lambda probe 13 and of the second lambda probe 16 and the output signal of the temperature sensor 14 are supplied to a control unit 19. In the control unit 19, a program sequence for comparing the signals and for controlling and monitoring the regeneration is implemented. The control unit 19 can be integrated in the engine control system of the internal combustion engine 10, in which the lambda control is customarily implemented.

Overall, the burning of the particles can be followed by lambda probes, and it is possible to establish the extent to which the burning of the particles is ended and the regeneration phase can be ended. The method can be used with known broadband lambda probes, or even more cost-effective two-point lambda probes may be used. In many cases, probes of this type are already used in the exhaust gas duct 12 of the internal combustion engine 10, and therefore an additional outlay is unnecessary. The method and the device are in particular suitable also for cleaning exhaust gas of spark ignition engines.

The invention claimed is:

1. A method for monitoring and controlling regeneration of a particle filter in an exhaust gas duct of an internal combustion engine which has a three-way catalytic converter downstream of the particle filter, the method comprising: regenerating the particle filter by oxidative burning of particles during a regeneration phase, balancing oxygen consumption, directly or indirectly, during the regeneration phase via temporal variation of a first signal of a first lambda probe, which is arranged upstream of the particle filter, in comparison to a temporal variation of a second signal of a second lambda probe, which is arranged downstream of the particle filter, and setting a lambda value of $\lambda=1$ downstream of the three-way catalytic converter during the regeneration of the particle filter by means of lambda control and the second lambda probe which is arranged downstream of the three-way catalytic converter.

2. The method according to claim 1, wherein during the regeneration phase of the particle filter, exothermy as a consequence of burning soot is determined from the oxygen balancing upstream and downstream of the particle filter and, if a specified limit value for the exothermy is exceeded, the regeneration process is slowed down or ended.

3. The method according to claim 2, wherein if the limit value for the exothermy is exceeded, the regeneration is actively slowed down or ended with a lambda setting of $\lambda<1$.

4. The method according to claim 1, wherein by means of control to a lambda value of $\lambda<1$, a lack of oxygen arises and the soot is oxidized via an endothermic heterogeneous water and gas equilibrium reaction.

5. The method according to claim 1, wherein complete oxidation of soot embedded in the particle filter is detected from a comparison of the signals of the first lambda probe and from the signals of the second lambda probe.

6. The method according to claim 1, wherein an overrun cut off is prevented during the active regeneration phase.

7. The method according to claim 1, wherein during or after the regeneration phase, a lean operation with a lambda value of $\lambda>1$ is avoided if critical conditions are present.

8. The method according to claim 1 for regenerating a particle filter in an exhaust gas duct of an internal combustion engine, wherein the internal combustion engine is a spark ignition engine.

* * * * *